United States Patent
Wang et al.

(10) Patent No.: US 10,055,204 B2
(45) Date of Patent: Aug. 21, 2018

(54) GENERATING COMMUNICATION FIRMWARE AND A PROGRAM PLUG-IN BASED ON PRODUCT INFORMATION AND A PROGRAM TEMPLATE

(71) Applicant: Xiaomi Inc., Beijing (CN)

(72) Inventors: Yuanbo Wang, Beijing (CN); Qimin Sun, Beijing (CN); Feiyun Li, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/290,783

(22) Filed: Oct. 11, 2016

(65) Prior Publication Data
US 2017/0123767 A1 May 4, 2017

(30) Foreign Application Priority Data

Oct. 30, 2015 (CN) .......................... 2015 1 0729162

(51) Int. Cl.
*G06F 9/44* (2018.01)
*G06F 8/35* (2018.01)
(Continued)

(52) U.S. Cl.
CPC .................. *G06F 8/35* (2013.01); *G06F 8/30* (2013.01); *G06F 8/34* (2013.01); *G06F 8/36* (2013.01);
(Continued)

(58) Field of Classification Search
CPC .............................................. G06F 8/10–8/78
See application file for complete search history.

(56) References Cited

U.S. PATENT DOCUMENTS 8,261,231 B1 9/2012 Hirsch et al.
8,601,433 B2 * 12/2013 Son .......................... G06F 8/10
717/106
(Continued)

FOREIGN PATENT DOCUMENTS

CN 101933000 A 12/2010
CN 102461125 A 5/2012
(Continued)

OTHER PUBLICATIONS

Fluet, Michael et al., "Firmware Development Methodologies for Synthetic Test Instrumentation", pp. 1-6. (Year: 2014).*
(Continued)

*Primary Examiner* — Thuy Dao
*Assistant Examiner* — Christopher J Franco
(74) *Attorney, Agent, or Firm* — Oblon, McClelland, Maier & Neustadt, L.L.P.

(57) ABSTRACT

The present disclosure relates to a method, apparatus, and non-transitory computer readable medium for generating communication firmware and a program plug-in based on product information and a program template. Aspects of the disclosure provide a method that includes receiving first information related to a product; selecting, from a program template library, a target program template based on the first information; and generating communication firmware and a program plug-in based on the first information and the target program template. The communication firmware is configured to be built in a device related to the product, the program plug-in is configured to be installed in a terminal, and the device and the terminal are configured to implement a function of the product by using the communication firmware and the program plug-in, respectively.

11 Claims, 6 Drawing Sheets

(51) Int. Cl.
*G06F 8/61* (2018.01)
*G06F 8/34* (2018.01)
*G06F 8/30* (2018.01)
*G06F 8/36* (2018.01)
*G06F 8/20* (2018.01)
*G06F 8/10* (2018.01)

(52) U.S. Cl.
CPC ............... *G06F 8/61* (2013.01); *G06F 8/10* (2013.01); *G06F 8/20* (2013.01)

(56) References Cited

U.S. PATENT DOCUMENTS

| | | | |
|---|---|---|---|
| 8,832,644 B2* | 9/2014 | Hirsch | G06F 8/20 717/107 |
| 9,032,423 B2* | 5/2015 | Knichel | G06F 8/665 717/174 |
| 9,081,637 B2* | 7/2015 | Son | G06F 8/36 |
| 9,547,482 B2* | 1/2017 | Soffer | G06F 8/38 |
| 9,690,577 B1* | 6/2017 | Crew | G06F 9/22 |
| 2005/0144586 A1 | 6/2005 | Shieh et al. | |
| 2006/0271912 A1 | 11/2006 | Mickle et al. | |
| 2011/0072055 A1 | 3/2011 | Swaminathan et al. | |
| 2013/0047156 A1 | 2/2013 | Jian et al. | |
| 2013/0205278 A1* | 8/2013 | Hirsch | G06F 8/20 717/121 |
| 2014/0380340 A1* | 12/2014 | Knichel | G06F 8/654 719/327 |
| 2016/0132322 A1* | 5/2016 | Jones | G06F 8/654 717/168 |
| 2016/0357526 A1* | 12/2016 | Soffer | G06F 8/38 |

FOREIGN PATENT DOCUMENTS

| | | |
|---|---|---|
| CN | 102760081 A | 10/2012 |
| CN | 103002548 A | 3/2013 |
| JP | 2001-195438 A | 7/2001 |
| JP | 2010-237895 A | 10/2010 |
| JP | 6193460 B1 | 9/2017 |
| KR | 10 2003 0006600 A | 1/2003 |
| KR | 10 2007 0000732 A | 1/2007 |
| KR | 10 2010 0105737 A | 9/2010 |
| KR | 10 2014 0018329 A | 2/2014 |
| RU | 2 453 993 C2 | 6/2012 |
| RU | 2 456 772 C2 | 7/2012 |
| TW | I231441 B | 4/2005 |
| WO | WO 2012/023296 A1 | 2/2012 |
| WO | WO 2017/071078 A1 | 5/2017 |

OTHER PUBLICATIONS

Barner, Simon et al., "EasyLab—Model-Based Development of Software for Mechatronic Systems", pp. 540-545. (Year: 2008).*
Thoss, Marcus et al., "A Framework-Based Approach for Automated Testing of CNC Firmware", pp. 7-12. (Year: 2014).*
Krunic, Momcilo et al., "Automatic source code generation of peripheral hardware modules firmware", pp. 833-836. (Year: 2013).*
Axelson, Eyvind W., et al., "Adaptable Generic Programming with Required Type Specifications and Package Templates", pp. 83-94. (Year: 2012).*
Cetic, Nenad et al., "Unit Test Case Generator and Automated Regression Testing in Terms of Firmware Development", pp. 1079-1082. (Year: 2014).*
International Search Report dated Jul. 14, 2016 to International Application No. PCT/CN2015/099440, filed Dec. 29, 2015.
Combined Chinese Office Action and Search Report dated Feb. 23, 2018 in corresponding Patent Application No. 201510729162.3, 7 pages.
Japanese Office Action dated Nov. 14, 2017 in Patent Application No. 2017-547059.
Korean Office Action dated May 30, 2017 in Patent Application No. 10-2016-7005172 (with English translation).
Combine Russian Federation Office Action and Search Report dated Sep. 21, 2017 in Patent Application No. 2016124782/08(038896) (with English translation).
Tomokazu Murakami, et al., "Automatic Generation of Device Drivers for an Embedded Operating System" Graduate School of Information Science, Nara Institiute of Science and Technology, Aug. 4, 2000, p. 109-116.

* cited by examiner

GENERATING COMMUNICATION FIRMWARE AND A PROGRAM PLUG-IN BASED ON PRODUCT INFORMATION AND A PROGRAM TEMPLATE

CROSS-REFERENCE TO RELATED APPLICATIONS

This application is based upon and claims priority to Chinese Patent Application No. 201510729162.3, filed on Oct. 30, 2015, the entire contents of which are incorporated herein by reference.

TECHNICAL FIELD

The present disclosure generally relates to the field of communication module technologies, and more particularly, to a method, apparatus, and a non-transitory computer-readable medium for generating communication firmware and a program plug-in based on product information and a program template.

BACKGROUND

In order to accelerate the product development cycle, a supplier may set up for a third-party partner and a developer, based on a smart Wi-Fi module, an open platform including device connection and binding, data transmission and storage, and user interaction interface. The developer fills introduction of the company and the product thereof in the open platform, and gets the smart Wi-Fi module, a software development kit of communication module firmware, and a software development kit of a terminal application plug-in after being successfully reviewed at background. Since the module includes only basic firmware, the developer needs to conduct a customized development on the software development kit of the firmware and the software development kit of the terminal application plug-in in combination with functions of the developer's product. However, the developer knows nothing about the module structural system or details related to the software development kit of the communication module firmware and the software development kit of the terminal application plug-in. Accordingly, a lot of time needs to be spent to become familiar with these software development kits, wasting time and energy.

Thus, the need arises for a solution that provides developers with a simple and efficient way of creating firmware and software for communication devices.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method that includes receiving first information related to a product; selecting, from a program template library, a target program template based on the first information; and generating communication firmware and a program plug-in based on the first information and the target program template. The communication firmware is configured to be built in a device related to the product, the program plug-in is configured to be installed in a terminal, and the device and the terminal are configured to implement a function of the product by using the communication firmware and the program plug-in, respectively. The first information includes at least one of attribute information, trigger event information, and execution method information.

Selecting the target program template includes determining a type of the product based on the first information, and selecting, from the program template library, the target program template based on the type of the product.

Generating the communication firmware and the program plug-in includes acquiring a target parameter item needing a data replacement from the target program template, acquiring a target parameter from the first information based on the target parameter item, and replacing an existing parameter in the target parameter item with the target parameter.

The method also includes receiving a program template setting command, and setting up at least one program template according to the program template setting command to form the program template library.

Aspects of the disclosure also provide an apparatus including a processor and a memory configured to store instructions executable by the processor. The processor is configured to receive first information related to a product; select, from a program template library, a target program template based on the first information; and generate communication firmware and a program plug-in based on the first information and the target program template. The communication firmware is configured to be built in a device related to the product, the program plug-in is configured to be installed in a terminal, and the device and the terminal are configured to implement a function of the product by using the communication firmware and the program plug-in, respectively. The first information includes at least one of attribute information, trigger event information and execution method information.

When selecting the target program template, the processor is configured to determine a type of the product based on the first information, and select, from the program template library, the target program template based on the type of the product.

When generating the communication firmware, the processor is configured to acquire a target parameter item needing a data replacement from the target program template; acquire a target parameter from the first information based on the target parameter item, and replace an existing parameter in the target parameter item with the target parameter.

The processor is also configured to receive a program template setting command, and set up at least one program template according to the program template setting command to form the program template library.

Aspects of the disclosure also provide a non-transitory computer-readable storage medium having stored therein instructions that, when executed by a processor, causes the processor to perform a method. The method includes receiving first information related to a product; selecting, from a program template library, a target program template based on the first information; and generating communication firmware and a program plug-in based on the first information and the target program template. The communication firmware is configured to be built in a device related to the product, the program plug-in is configured to be installed in a terminal, and the device and the terminal are configured to implement a function of the product by using the communication firmware and the program plug-in, respectively.

It is to be understood that both the foregoing general description and the following detailed description are only exemplary and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

DETAILED DESCRIPTION

Reference will now be made in detail to exemplary aspects of the present disclosure, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

The terminologies used herein are only for describing particular aspects but not for limiting the present disclosure. The singular form words "a," "the," and "said" used in the present disclosure and append claims are intended to include plural form, unless otherwise clearly stated. Also, it shall be appreciated that the terminology "and/or" used herein refers to any or all combinations of one or more listed related items.

Figure 1:
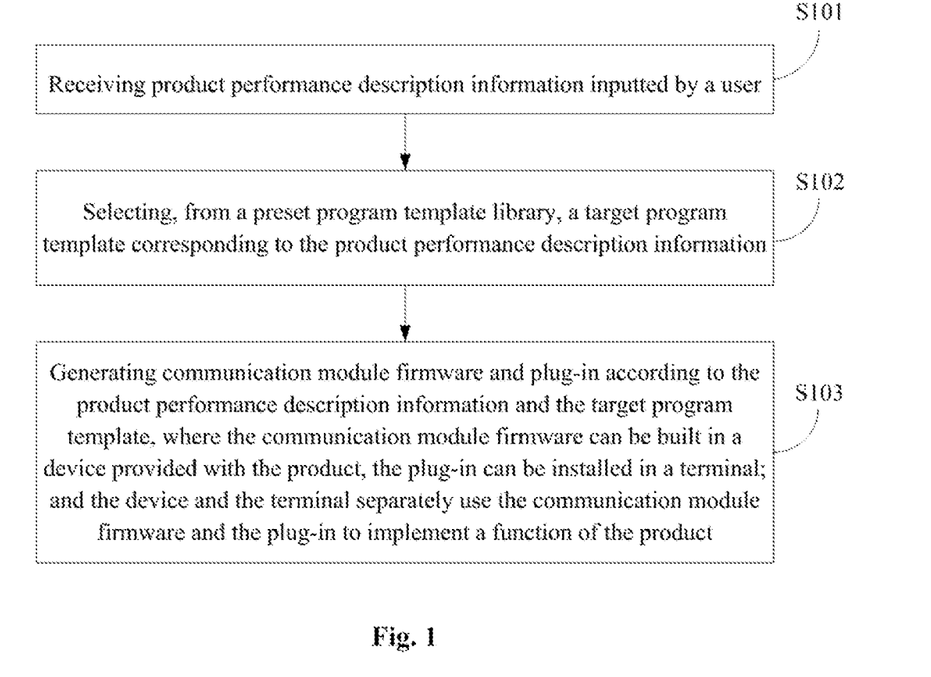
FIG. 1 is a flowchart illustrating a method for generating communication module firmware and plug-in according to an exemplary aspect of the present disclosure.

The aspects of the present disclosure provide a method for generating communication module firmware and plug-in (e.g., program add-on). As shown in FIG. 1, the method includes Steps S101-S103.

In Step S101, product performance description information (e.g., first information related to a product) inputted by a user is received, where the product performance description information includes at least one of the following information: attribute information, trigger event information and execution method information.

In an aspect, the attribute information includes at least one of the following information: a product name, a product description, a data type of product data, a value range of the product data, a product default value, product readability and writability, and automatic reportability of the product.

The trigger event information includes at least one of the following information: a trigger event name, an event description, a number of parameters carried upon triggering and a name of each parameter, a data type, a value range and a default value.

The execution method information includes at least one of the following information: an execution method name, an execution method description, a number of parameters to be transferred, a number of fields contained in a return value, a name of each parameter and of each field, a data type, a value range and a default value.

In Step S102, a target program template corresponding to the product performance description information is selected from a preset program template library.

Figure 2:
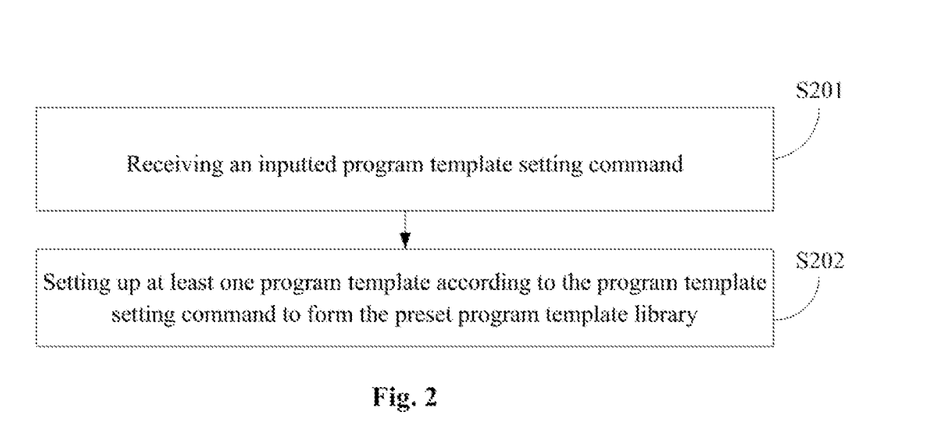
FIG. 2 is a flowchart illustrating a method for generating communication module firmware and plug-in according to an exemplary aspect of the present disclosure.

A user or a manufacturer may set up a plurality of program templates according to individual needs. As shown in FIG. 2, a procedure for the setup includes Steps S201-S202.

In Step S201, an inputted program template setting command is received.

In Step S202, at least one program template is set up according to the program template setting command to form the preset program template library. In this way, the preset program template library is set up, such that the target program template corresponding to the product performance description can be selected from the preset program template library when it is required to generate the communication module firmware and plug-in corresponding to the product.

In Step S103, the communication module firmware and plug-in are generated according to the product performance description information and the target program template, where the communication module firmware can be built in a device provided with the product, the plug-in can be installed in a terminal; and the device and the terminal separately are capable of implementing a function of the product by using the communication module firmware and plug-in, respectively.

In this aspect, the communication module firmware and plug-in are automatically generated according to the product performance description information inputted by the user and the target program template. In this way, the communication module firmware is built in the device, the plug-in is installed in the terminal, and interaction between the terminal and the device can be thus implemented, thereby implementing the function of the product. Accordingly, the communication module firmware and plug-in are automatically generated according to the product performance description inputted by a developer without necessity for the developer to get familiar with architecture and detail of the communication module and to manually write a code for generating the communication module firmware and plug-in capable of implementing the function of the product, thereby reducing user operations and improving user experience.

Figure 3:
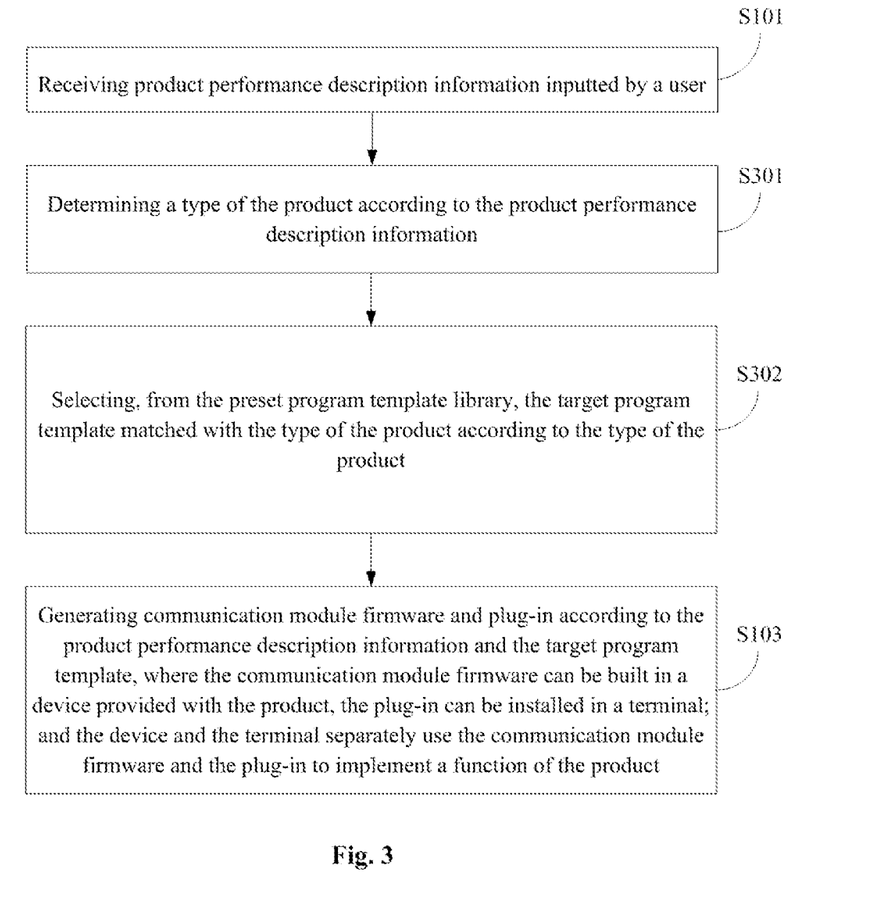
FIG. 3 is a flowchart illustrating another method for generating communication module firmware and plug-in according to an exemplary aspect of the present disclosure.

As shown in FIG. 3, in an aspect, the foregoing Step S102 includes Steps S301-S302.

In Step S301, a type of the product is determined according to the product performance description information.

In Step S302, the target program template matched with the type of the product is selected from the preset program template library according to the type of the product.

In this aspect, the type of the product can be determined according to the product performance description, and different types of products correspond to different program templates. In this way, the target program template corresponding to the current product can be determined, and thus the corresponding communication module firmware and plug-in can be generated for the current product according to the target program template, so as to implement the function of the target program template. Accordingly, the developer does not need to get familiar with architecture and detail of the communication module or manually write a code to generate the communication module firmware and plug-in capable of implementing the function of the product, thereby reducing user operations and improving user experience.

Figure 4:
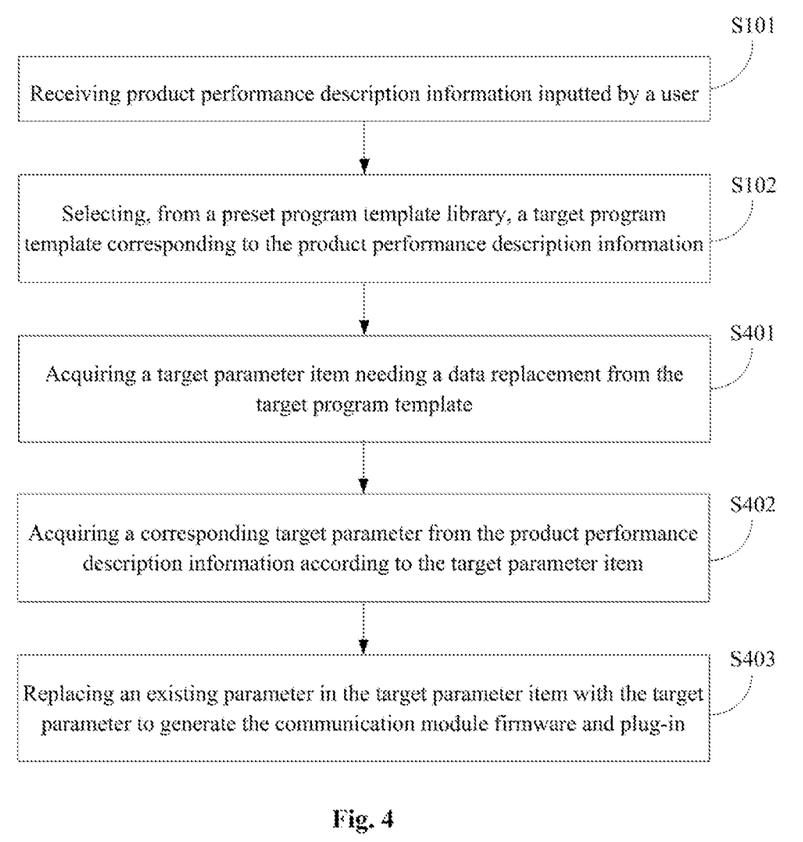
FIG. 4 is a flowchart illustrating a further method for generating communication module firmware and plug-in according to an exemplary aspect of the present disclosure.

As shown in FIG. 4, in an aspect, the foregoing Step S103 includes Steps S401-S403.

In Step S401, a target parameter item needing a data replacement is acquired from the target program template.

In Step S402, a corresponding target parameter is acquired from the product performance description information according to the target parameter item; and In Step S403, an existing parameter in the target parameter item is replaced with the target parameter, and the communication module firmware and plug-in are thus generated.

In this aspect, the target program template includes a plurality of target parameter items, for example, a module name, a method name (i.e., a function name), a method type and a return value, etc. In this way, corresponding parameters are found from the product performance description information according to these target parameter items, and existing parameters in the target parameter items are replaced by these parameters. In this way, the communication module firmware and plug-in corresponding to the product can be generated, the communication module firmware can be thus built in the device, the plug-in can be thus installed in the terminal, and interaction between the terminal and the device is able to be implemented, thereby implementing the function of the product.

For example, a method referred to as "test" is defined by a certain product, and it is defined that a field "b" (a string type, having a length range of 0-10) is contained in a return value received by a parameter "a" (an int type, having a range of 0-10) needing to be transferred, and a method invocation protocol is defined. When a method of the device is invoked, it is needed to acquire the target program template corresponding to the device, for example, {"did": "deviceId", "method": "methodName", "params":[ . . . ]}. If a code for invoking the method needs to be generated, what needs to be done is nothing but replacement of values for "did", "method" and "params" in this target program template, while the remaining part may reuse a general code logic.

The following is the aspect of the apparatus in the present disclosure, which may be configured to carry out the aspect of the method in the present disclosure.

Figure 5:
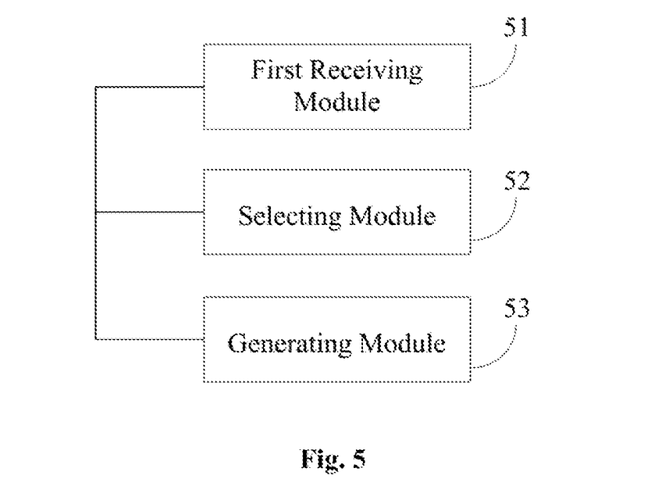
FIG. 5 is a block diagram illustrating an apparatus for generating communication module firmware and plug-in according to an exemplary aspect of the present disclosure.

FIG. 5 is a block diagram illustrating another apparatus for generating communication module firmware and plug-in according to an exemplary aspect. The apparatus may be implemented to become an electronic device in part or in whole by means of software or hardware or a combination of both.

As shown in FIG. 5, the apparatus for generating communication module firmware and plug-in includes: a first receiving module 51 configured to receive product performance description information regarding a product inputted by a user, the product performance description information including at least one of the following information: attribute information, trigger event information and execution method information; a selecting module 52 configured to select, from a preset program template library, a target program template corresponding to the product performance description information; and a generating module 53 configured to generate communication module firmware and plug-in according to the product performance description information and the target program template, the communication module firmware is able to be built in a device provided with the product, the plug-in is able to be installed in a terminal; and the device and the terminal is able to implement a function of the product by using the communication module firmware and the plug-in, respectively.

In an aspect, the attribute information includes at least one of the following information: the product name, the product description, the data type of product data, the value range of the product data, the product default value, product readability and writability, and automatic reportability of the product.

The trigger event information includes at least one of the following information: the trigger event name, the event description, the number of parameters carried during triggering and the name of each parameter, the data type, the value range and the default value.

The execution method information includes at least one of the following information: the execution method name, the execution method description, the number of parameters needing to be transferred, the number of fields contained in a return value, the name of each parameter and of each field, the data type, the value range and the default value.

Figure 6:
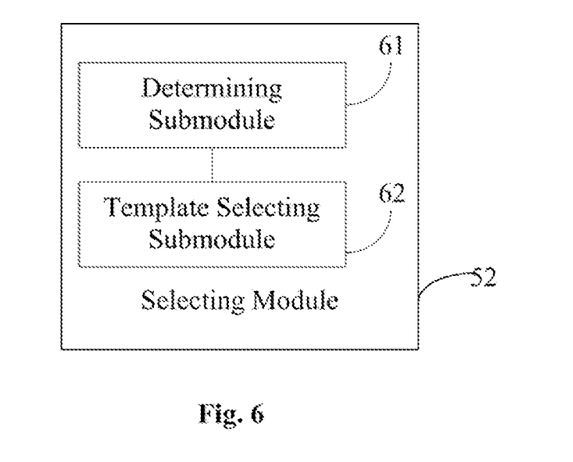
FIG. 6 is a block diagram illustrating a selecting module in the apparatus for generating communication module firmware and plug-in according to an exemplary aspect of the present disclosure.

As shown in FIG. 6, in an aspect, the selecting module 52 includes: a determining submodule 61 configured to determine a type of the product according to the product performance description information; and a template selecting submodule 62 configured to select, from the preset program template library, the target program template matched with the type of the product according to the type of the product.

Figure 7:
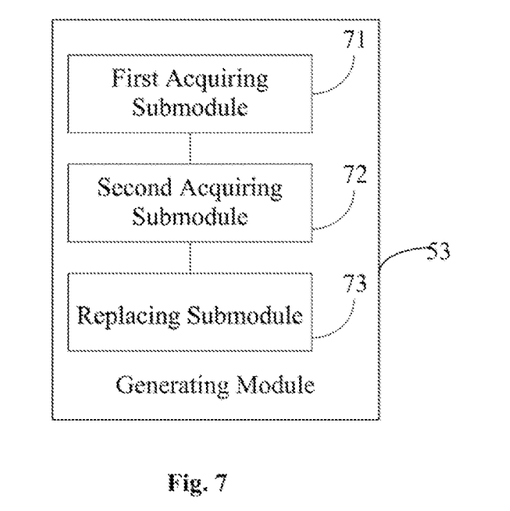
FIG. 7 is a block diagram illustrating a generating module in the apparatus for generating communication module firmware and plug-in according to an exemplary aspect of the present disclosure.

As shown in FIG. 7, in an aspect, the generating module 53 includes: a first acquiring submodule 71 configured to acquire a target parameter item needing a data replacement from the target program template; a second acquiring submodule 72 configured to acquire a corresponding target parameter from the product performance description information according to the target parameter item; and a replacing submodule 73 configured to replace an existing parameter in the target parameter item with the target parameter and generate the communication module firmware and plug-in.

Figure 8:
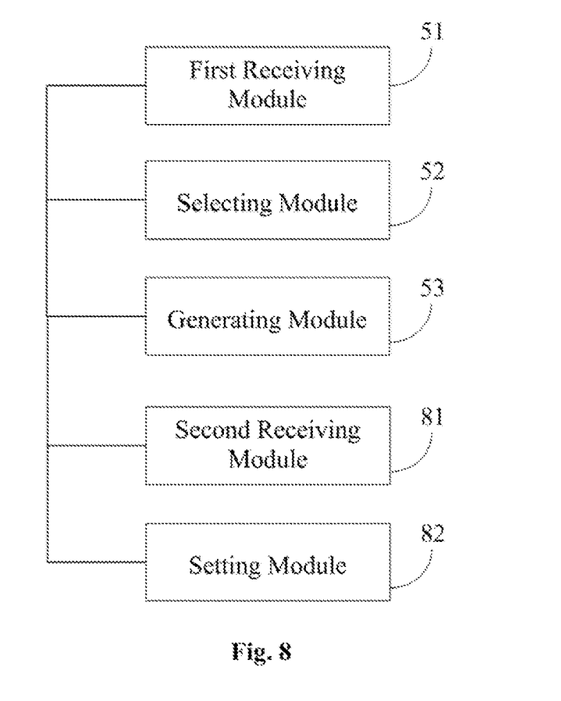
FIG. 8 is a block diagram illustrating another apparatus for generating communication module firmware and plug-in according to an exemplary aspect of the present disclosure.

As shown in FIG. 8, in an aspect, the foregoing apparatus further includes: a second receiving module 81 configured to receive an inputted program template setting command; and a setting module 82 configured to set up at least one program template according to the program template setting command to form the preset program template library.

According to a third aspect of the aspects of the present disclosure, an apparatus for generating communication module firmware and plug-in is provided, including: a processor; and a memory configured to store instruction executable by the processor; where the processor is configured to: receive product performance description information inputted by a user; select, from a preset program template library, a target program template corresponding to the product performance description information; and generate communication module firmware and plug-in according to the product performance description information and the target program template, the communication module firmware is able to be built in a device provided with the product, the plug-in is able to be installed in a terminal; and the device and the terminal is able to implement a function of the product by using the communication module firmware and the plug-in, respectively.

The foregoing processor may also be configured as follows. The product performance description information includes at least one of the following information: attribute information, trigger event information and execution method information.

The attribute information includes at least one of the following information: the product name, the product description, the data type of product data, the value range of the product data, the product default value, product readability and writability, and automatic reportability of the product.

The trigger event information includes at least one of the following information: the trigger event name, the event description, the number of parameters carried during triggering and the name of each parameter, the data type, the value range and the default value.

The execution method information includes at least one of the following information: the execution method name, the execution method description, the number of parameters needing to be transferred, the number of fields contained in a return value, the name of each parameter and of each field, the data type, the value range and the default value.

The processor also may be configured to: select, from a preset program template library, a target program template corresponding to the product performance description information by: determining a type of the product according to the product performance description information; and selecting, from the preset program template library, the target program template matched with the type of the product according to the type of the product.

The processor also may be configured to: generate communication module firmware and plug-in according to the product performance description information and the target program template by: acquiring a target parameter item needing a data replacement from the target program template; acquiring a corresponding target parameter from the product performance description information according to the target parameter item; and replacing an existing parameter in the target parameter item with the target parameter, so as to generate the communication module firmware and plug-in.

The method further includes: receiving an inputted program template setting command; and setting up at least one program template according to the program template setting command to form the preset program template library.

With regard to the apparatus in the foregoing aspects, specific manners for executing operation by modules thereof have been described in detail in the aspects related to the method, and thus are not elaborated herein.

Figure 9:
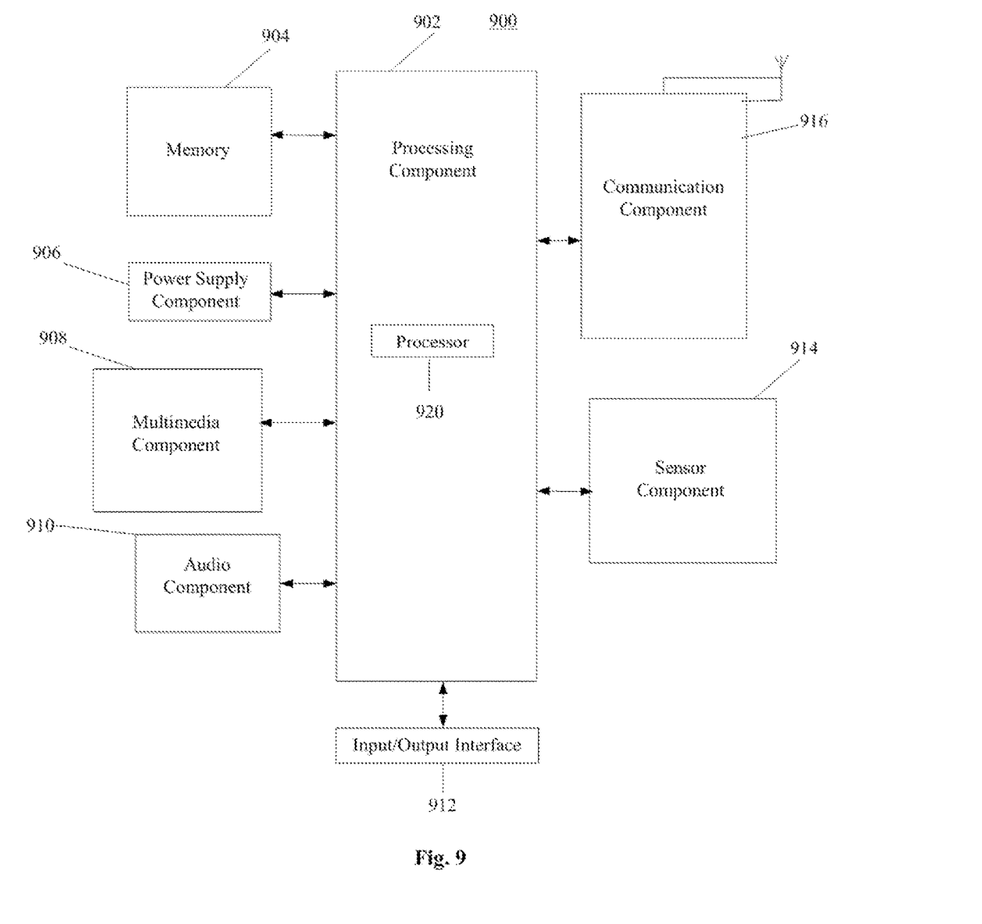
FIG. 9 is a block diagram applicable to a device for generating communication module firmware and plug-in according to an exemplary aspect of the present disclosure.

FIG. 9 is a block diagram illustrating an apparatus for generating communication module firmware and plug-in according to an exemplary aspect, and the apparatus is applicable to an electronic device. For example, the apparatus 900 may be a mobile telephone, a computer, a digital broadcasting terminal, a message transceiver device, a games console, a tablet device, a medical device, a fitness facility, a personal digital assistant and the like.

The apparatus 900 may include one or more components as below: a processing component 902, a memory 904, a power supply component 906, a multimedia component 908, an audio component 910, an input/output (I/O) interface 912, a sensor component 914 and a communication component 916.

The processor module 902 generally controls the overall operation of the apparatus 900, for example, operations associated with display, telephone call, data communication, camera operation and record operation. The processing component 902 may include one or more processors 920 for executing an instruction to complete steps of the foregoing method in part or in whole. In addition, the processing component 902 may include one or more modules for the convenience of interaction between the processing component 902 and other components. For example, the processing component 902 may include a multimedia module for the convenience of interaction between the multimedia component 908 and the processing component 902.

The memory 904 is configured to store various types of data so as to support the operation of the apparatus 900. Examples of the data include an instruction of any application program or method operated on the apparatus 900, contact data, phonebook data, a message, a picture and a video, etc. The memory 904 may be implemented by any type of volatile or non-volatile memory device or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power supply component 906 provides power for various components of the apparatus 900. The power supply component 906 may include a power management system, one or more power supplies, and other components associated with generation, management and power distribution of the apparatus 900.

The multimedia component 908 includes a screen between the apparatus 900 and a user for providing an output interface. In some aspects, the screen may include a liquid crystal display (LCD) and a touch panel (TP). If the screen includes the touch panel, the screen may be implemented as a touch screen for receiving an input signal from the user. The touch panel includes one or more touch sensors for sensing a touch, slide and gestures on the touch panel. The touch sensor may not only sense a boundary of a touch or slide, but also detect the time duration and pressure related to the touch or slide operation. In some aspects, the multimedia component 908 includes a front-facing camera and/or a rear-facing camera. When the apparatus 900 is in an operation mode, for example, a shooting mode or a video mode, the front-facing camera and/or the rear-facing camera may receive external multimedia data. Each front-facing camera and rear-facing camera may be a fixed optical lens system or have a focal length and optical zoom capacity.

The audio component 910 is configured to output and/or input an audio signal. For example, the audio component 910 includes a microphone (MIC); when the apparatus 900 is in an operation mode such as a call mode, a record mode and a speech recognition mode, the microphone is configured to receive an external audio signal. The received audio signal may be further stored in the memory 904 or sent out by the communication component 916. In some aspects, the audio component 910 also includes a loudspeaker for outputting the audio signal.

The I/O interface 912 provides an interface for the processing component 902 and a peripheral interface module, and the peripheral interface module may be a keyboard, a click wheel and buttons, etc. These buttons may include but are not limited to: a home button, a volume button, a start button and a lock button.

The sensor component 914 includes one or more sensors for providing the apparatus 900 with a state evaluation from all aspects. For example, the sensor component 914 may detect the on/off state of the apparatus 900, relative positioning of components, for example, the components are the displayer and keypads of the apparatus 900; the sensor component 914 also may detect the position change of the apparatus 900 or a component thereof, the presence or absence of the user's touch on the apparatus 900, the direction or acceleration/deceleration of the apparatus 900, and temperature variation of the apparatus 900. The sensor component 914 may also include a proximity detector, which is configured to detect the presence of a nearby object in case of no physical contact. The sensor component 914 may also include an optical sensor, for example, a CMOS or CCD image sensor, used in the application of imaging. In some aspects, the sensor component 914 may also include an acceleration sensor, a gyro sensor, a magnetic sensor, a pressure sensor, or a temperature sensor.

The communication component 916 is configured to facilitate wired communication or wireless communication between the apparatus 900 and other devices. The apparatus 900 is available for access to a wireless network based on communication standards, for example, Wi-Fi, 2G or 3G or a combination thereof. In an exemplary aspect, the communication component 916 receives, by means of a broadcast channel, a broadcast signal or broadcast-related information from an external broadcast management system. In an exemplary aspect, the communication component 916 also includes a near field communication (NFC) module to promote short-range communication. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In an exemplary aspect, the apparatus 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing method.

In an exemplary aspect, a non-transitory computer-readable storage medium including an instruction is also provided, for example, a memory 904 including the instruction, and the instruction may be executed by the processor 920 of the apparatus 900 to achieve the foregoing method. For example, the non-transitory computer-readable storage medium may be ROM, random access memory (RAM), CD-ROM, magnetic tape, floppy disk and optical data storage device, etc.

A non-transitory computer-readable storage medium, when an instruction in the storage medium is executed by the processor of the apparatus 900, the apparatus 900 can execute a method for generating communication module firmware and plug-in, and the method includes: receiving product performance description information inputted by a user; selecting, from a preset program template library, a target program template corresponding to the product performance description information; and generating communication module firmware and plug-in according to the product performance description information and the target program template, the communication module firmware is able to be built in a device provided with the product, the plug-in is able to be installed in a terminal; and the device and the terminal are able to implement a function of the product by using the communication module firmware and the plug-in, respectively.

In an aspect, the product performance description information includes at least one of the following information: attribute information, trigger event information and execution method information.

The attribute information includes at least one of the following information: the product name, the product description, the data type of product data, the value range of the product data, the product default value, product readability and writability, and automatic reportability of the product.

The trigger event information includes at least one of the following information: the trigger event name, the event description, the number of parameters carried during triggering and the name of each parameter, the data type, the value range and the default value.

The execution method information includes at least one of the following information: the execution method name, the execution method description, the number of parameters needing to be transferred, the number of fields contained in a return value, the name of each parameter and of each field, the data type, the value range and the default value.

In an aspect, the selecting, from a preset program template library, a target program template corresponding to the product performance description information includes: determining a type of the product according to the product performance description information; and selecting, from the preset program template library, the target program template matched with the type of the product according to the type of the product.

In an aspect, the generating communication module firmware and plug-in according to the product performance description information and the target program template includes: acquiring a target parameter item needing a data replacement from the target program template; acquiring a corresponding target parameter from the product performance description information according to the target parameter item; and replacing an existing parameter in the target parameter item with the target parameter so as to generate the communication module firmware and plug-in.

In an aspect, the method further includes: receiving an inputted program template setting command; and setting up at least one program template according to the program template setting command to form the preset program template library.

In aspects of the present disclosure, the various modules (e.g., modules 51, 52, 53, 81, 82), sub-modules (e.g., sub-modules 61, 62, 71, 72, 73), components (e.g., components 902, 906, 908, 910, 914, 916), and units may be implemented as processing circuitry that is configured to perform the various functions of the respective modules, sub-modules, components, and units.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the precise structures that have been described above and illustrated in the accompanying drawings, and that various modifications and changes may be made without departing from the scope thereof. It is intended that the scope of the present disclosure only be limited by the appended claims.

What is claimed is:

1. A method for facilitating a customized development of communication firmware and a program plug-in based on a Wi-Fi module, the method comprising:
configuring the communication firmware to be built in a device related to a product;
receiving the Wi-Fi module and information of product performance of the product as a target of the customized development of the communication firmware and the program plug-in;
selecting, from a program template library, a target program template based on the information; and
generating the communication firmware and the program plug-in associated with the customized development based on the information, the Wi-Fi module, and the target program template,
wherein the program plug-in is configured to be installed in a terminal different from the device, and
wherein the device and the terminal are configured to implement the product performance as the target of the customized development by using the communication firmware and the program plug-in, respectively.

2. The method of claim 1, wherein the information includes at least one of attribute information, trigger event information, and execution method information.

3. The method of claim 1, wherein selecting the target program template includes:
determining a type of the product based on the information; and
selecting, from the program template library, the target program template based on the type of the product.

4. The method of claim 1, wherein generating the communication firmware and the program plug-in includes:
acquiring a target parameter item needing a data replacement from the target program template;
acquiring a target parameter from the information based on the target parameter item; and
replacing an existing parameter in the target parameter item with the target parameter.

5. The method of claim 1, further comprising:
receiving a program template setting command; and
setting up at least one program template according to the program template setting command to form the program template library.

6. An apparatus for facilitating a customized development of communication firmware and a program plug-in based on a Wi-Fi module, the apparatus comprising:
a processor; and
a memory configured to store instructions executable by the processor;
wherein the processor is configured to:
configure the communication firmware to be built in a device related to a product;
receive the Wi-Fi module and information of product performance of the product as a target of the customized development of the communication firmware and the program plug-in;
select, from a program template library, a target program template based on the information; and
generate the communication firmware and the program plug-in associated with the customized development based on the information, the Wi-Fi module, and the target program template,
wherein the program plug-in is configured to be installed in a terminal different from the device, and
wherein the device and the terminal are configured to implement the product performance as the target of the customized development by using the communication firmware and the program plug-in, respectively.

7. The apparatus of claim 6, wherein the information includes at least one of attribute information, trigger event information and execution method information.

8. The apparatus of claim 6, wherein when selecting the target program template, the processor is configured to:
determine a type of the product based on the information; and
select, from the program template library, the target program template based on the type of the product.

9. The apparatus of claim 6, wherein when generating the communication firmware, the processor is configured to:
acquire a target parameter item needing a data replacement from the target program template;
acquire a target parameter from the information based on the target parameter item; and
replace an existing parameter in the target parameter item with the target parameter.

10. The apparatus of claim 6, wherein the processor is further configured to:
receive a program template setting command; and
set up at least one program template according to the program template setting command to form the program template library.

11. A non-transitory computer-readable storage medium having stored therein instructions that, when executed by a processor, causes the processor to perform a method for facilitating a customized development of communication firmware and a program plug-in based on a Wi-Fi module, the method comprising:
configuring the communication firmware to be built in a device related to a product;
receiving the Wi-Fi module and information of product performance of the product as a target of the customized development of the communication firmware and the program plug in;
selecting, from a program template library, a target program template based on the information; and
generating the communication firmware and the program plug-in associated with the customized development based on the information, the Wi-Fi module, and the target program template,
wherein the program plug-in is configured to be installed in a terminal different from the device, and
wherein the device and the terminal are configured to implement the product performance as the target of the customized development by using the communication firmware and the program plug-in, respectively.

* * * * *